United States Patent
Martin

(10) Patent No.: US 6,672,244 B1
(45) Date of Patent: Jan. 6, 2004

(54) FUEL LEVEL INDICATOR SYSTEM

(76) Inventor: Michael J. Martin, 362 Central Ave, Pawtucket, RI (US) 02860

( * ) Notice: Subject to any disclaimer, the term of this patent is extended or adjusted under 35 U.S.C. 154(b) by 0 days.

(21) Appl. No.: 10/159,071

(22) Filed: May 31, 2002

(51) Int. Cl.$^7$ ............................................... G01F 23/00
(52) U.S. Cl. ........................................ 116/109; 141/95
(58) Field of Search ................................ 116/109, 227, 116/110; 141/94, 95; 403/299; 411/178, 383, 384; 285/334.1, 334.2, 334.4, 390; 138/109

(56) References Cited

U.S. PATENT DOCUMENTS

| | | | | |
|---|---|---|---|---|
| 1,842,897 A | * | 1/1932 | Culp ........................... 285/18 |
| 2,140,549 A | * | 12/1938 | Scully et al. ................ 116/109 |
| RE22,391 E | * | 11/1943 | Mathey ....................... 137/558 |
| 2,356,283 A | * | 8/1944 | Steins ...................... 122/504.2 |
| 2,360,338 A | | 10/1944 | Hammand |
| 2,759,489 A | * | 8/1956 | Schutter ..................... 137/558 |
| 2,910,956 A | * | 11/1959 | Sculty ........................ 116/109 |
| 2,935,099 A | * | 5/1960 | Haynes ......................... 141/95 |
| 3,635,275 A | * | 1/1972 | Davis et al. ................ 152/429 |
| 3,675,614 A | | 7/1972 | Ward et al. |
| 3,924,559 A | | 12/1975 | Renner et al. .............. 116/109 |
| 4,173,989 A | * | 11/1979 | Prest .......................... 138/109 |
| 4,266,813 A | * | 5/1981 | Oliver ......................... 285/12 |
| 4,682,796 A | * | 7/1987 | Parrow et al. ................ 285/39 |
| 4,997,013 A | * | 3/1991 | Peckels ........................ 141/95 |
| 5,007,450 A | * | 4/1991 | Babb et al. ............. 137/315.08 |
| 5,023,608 A | | 6/1991 | Delisle et al. ............... 340/984 |
| D360,612 S | | 7/1995 | Whitley |
| 5,452,748 A | * | 9/1995 | Simmons et al. ............. 138/89 |
| 5,485,872 A | * | 1/1996 | Kerger ........................ 141/329 |
| 5,829,491 A | * | 11/1998 | Bennett ........................ 141/59 |
| 5,832,968 A | | 11/1998 | Leary ........................... 141/94 |
| 5,906,402 A | * | 5/1999 | Simmons et al. ........... 285/333 |
| 5,971,438 A | * | 10/1999 | Johnson ........................ 285/12 |
| 6,481,456 B1 | * | 11/2002 | Falkner ....................... 137/206 |
| 6,536,465 B2 | * | 3/2003 | David et al. ................. 137/442 |
| 6,601,604 B1 | * | 8/2003 | Cooper ........................ 137/269 |
| 2002/0148505 A1 | * | 10/2002 | David et al. ................. 137/442 |

* cited by examiner

Primary Examiner—Christopher W. Fulton
Assistant Examiner—R. Alexander Smith

(57) ABSTRACT

A fuel level indicator system includes a housing member that is couplable to a fuel tank. The housing member is positionable adjacent to a vent opening in the fuel tank. The housing member defines an interior space. The housing member has a lower aperture facilitating environmental communication between the interior space and an interior of the fuel tank. The housing member has an upper aperture. A vent portion is coupled to the housing. The vent portion is in environmental communication with the interior space of the housing member via the upper aperture. The vent portion facilitates air flow from the interior of the fuel tank through the housing and out of the system. A whistle assembly is positioned substantially within the housing. The whistle assembly produces an aural indication of airflow through the housing member.

3 Claims, 3 Drawing Sheets

FUEL LEVEL INDICATOR SYSTEM

BACKGROUND OF THE INVENTION

1. Field of the Invention

The present invention relates to fluid level indicator systems and more particularly pertains to a new fuel level indicator system for providing a user with an audible warning system designed to prevent accidental overflow of gasoline being added to the fuel tank of a boat.

2. Description of the Prior Art

The use of fluid level indicator systems is known in the prior art. U.S. Pat. No. 5,023,608 describes a fuel filler alarm for boats including a housing, a whistle element on the housing an a suction ring on the housing. Another type of fluid level indicator system is U.S. Pat. No. 5,832,968 describes a fuel overfill warning device including a vent tube. A whistle alarm is positioned within the vent tube. U.S. Pat. No. 2,360,338 describes a whistling nozzle. U.S. Pat. No. 3,675,614 describes a fluid level alarm device for tanks and the like to minimize spills of oil and other environmental pollutants. U.S. Pat. No. 3,924,559 describes a signaling device for preventing spill-over from the fuel tanks of powered boats during filling. U.S. Pat. No. Des. 360,612 describes an ornamental design for a fuel fill device for boats.

SUMMARY OF THE INVENTION

The object of the present invention is to provide a new fuel level indicator system that would allow a single user to fill the fuel tank without overflowing the tank.

Another object of the present invention is to provide a new fuel level indicator system that would help prevent a possible fire, water contamination, or an expensive fine.

To this end, the present invention generally comprises a housing member that is coupleable to a fuel tank. The housing member is positionable adjacent to a vent opening in the fuel tank. The housing member defines an interior space. The housing member has a lower aperture facilitating environmental communication between the interior space and an interior of the fuel tank. The housing member has an upper aperture. A vent portion is coupled to the housing. The vent portion is in environmental communication with the interior space of the housing member via the upper aperture. The vent portion facilitates air flow from the interior of the fuel tank through the housing and out of the system. A whistle assembly is positioned substantially within the housing. The whistle assembly produces an aural indication of airflow through the housing member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
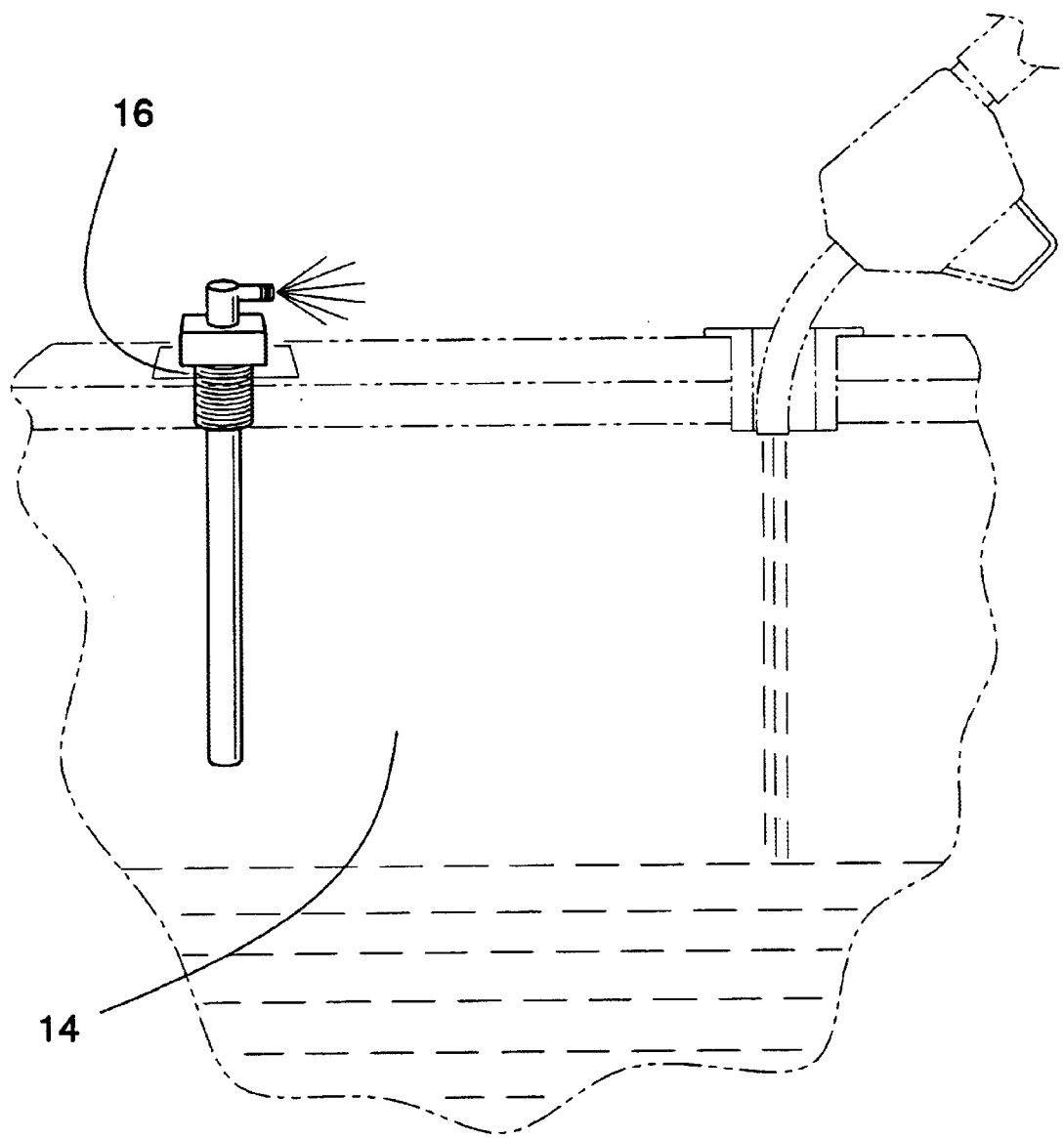
FIG. 1 is a in-use view of a new fuel level indicator system according to the present invention.
Figure 2:
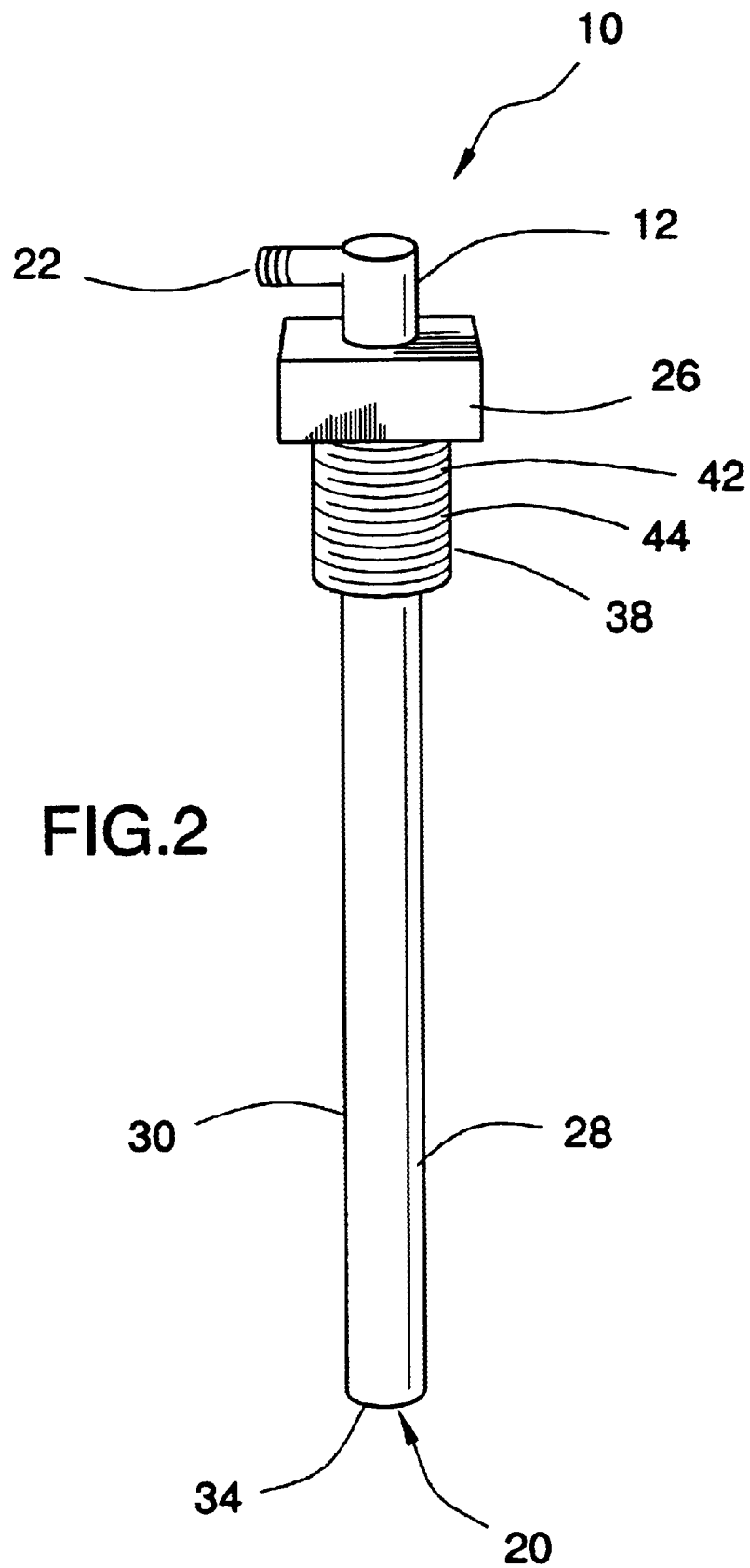
FIG. 2 is a perspective view of the present invention.
Figure 3:
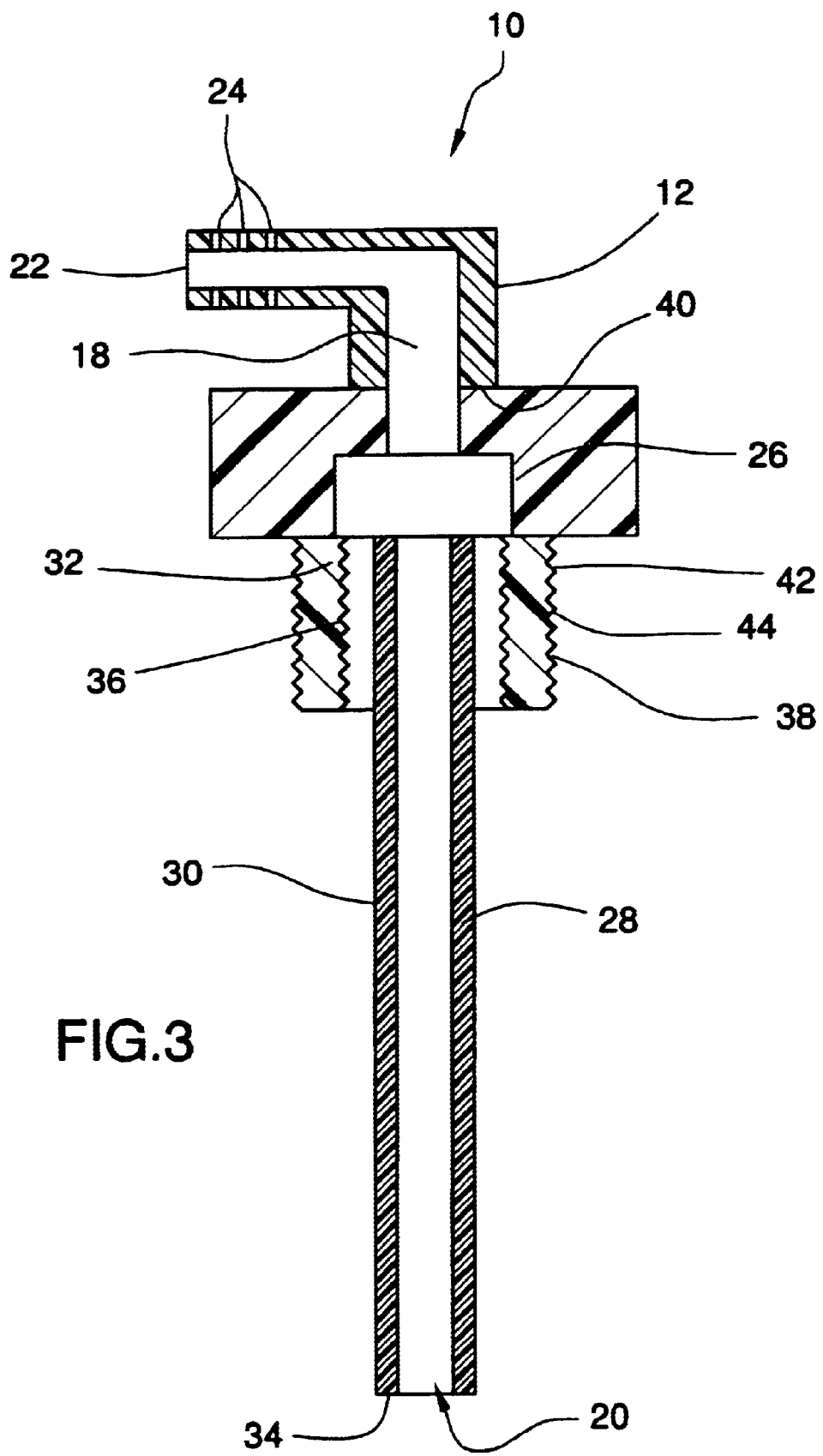
FIG. 3 is a side cross-sectional view of the present invention.

With reference now to the drawings, and in particular to FIGS. 1 through 3 thereof, a new fuel level indicator system embodying the principles and concepts of the present invention and generally designated by the reference numeral 10 will be described.

As best illustrated in FIGS. 1 through 3, the fuel level indicator system 10 generally comprises a housing member 12 that is coupleable to a fuel tank 14. The housing member 12 is positionable adjacent to a vent opening 16 in the fuel tank 14. The housing member 12 defines an interior space 18. The housing member 12 has a lower aperture 20 facilitating environmental communication between the interior space 18 and an interior of the fuel tank 14. The housing member 12 has an upper aperture 22. A vent portion 24 is coupled to the housing 12. The vent portion 24 is in environmental communication with the interior space 18 of the housing member 12 via the upper aperture 22. The vent portion 24 facilitates air flow from the interior of the fuel tank 14 through the housing 12 and out of the system. A whistle assembly 26 is positioned substantially within the housing 12. The whistle assembly 26 produces an aural indication of airflow through the housing member 12.

A drop tube member 28 has a perimeter wall 30. The drop tube member 28 is elongate. The drop tube member 28 is substantially cylindrical and hollow. The drop tube member 28 is aligned with the lower aperture 20. The drop tube member 28 has a proximal end 32 abutting the housing member 12. The drop tube member 28 has a distal end 34. The drop tube member 28 has a length associated with a fill level of the fuel tank 14 such that the distal end 34 is positionable to abut a plane defined by the fill level of the fuel tank 14 such that when fuel reaches the fill level the fuel substantially blocks the distal end 34 and airflow is inhibited whereby the whistle assembly 26 does not create an aural indication.

The housing member 12 further includes a threaded portion 36. The threaded portion 36 has a perimeter wall 38 that extends downwardly from a bottom wall 40 of the housing member 12. The threaded portion 36 has threads applied to a first surface 42 of the perimeter wall 38 for selectively coupling the housing member 12 to a female threaded vent. The threaded portion 36 has threads applied to a second surface 44 of the perimeter wall 38 facilitating coupling the housing member 12 to a male threaded vent.

In use, the user would attach the present invention to the vent that is either female of male-threaded, with the vent directed upward from the top of the housing. The drop tube would be directed straight downward from the housing and into the upper portion of the boat's fuel tank. The bottom end of the tube would terminate at approximately the fill line for the tank. The whistle would rest atop the tube within the housing.

As the boat's fuel tank is being filled by the user at one end the present invention would be installed at the opposite upper end. As fuel is added, the air being displaced from the tank would be forced up through the drop tube where it would steadily sound the whistle. As long as fuel is being added and the tank is not yet filled, the whistle would continue to sound. Once the tank approaches the filled level, fuel would close off the drop tube of the present invention, thus silencing the whistle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fueling level indicator system comprising:
   a housing member couplable to a fuel tank, said housing member being positionable adjacent to a vent opening in the fuel tank, said housing member defining an interior space, said housing member having a lower aperture facilitating environmental communication between said interior space and an interior of the fuel tank, said housing member having an upper aperture;
   a vent portion coupled to said housing, said vent portion being in environmental communication with said interior space of said housing member via said upper aperture, said vent portion facilitating air flow from the interior of the fuel tank through said housing and out of said system; and
   a whistle assembly positioned substantially within said housing, said whistle assembly producing an aural indication of airflow through said housing member;
   wherein said housing member further comprises a threaded portion, said threaded portion having a perimeter wall extending downwardly from a bottom wall of said housing member, said threaded portion having threads applied to an outer surface of said perimeter wall for selectively coupling said housing member to a female threaded vent, said threaded portion having threads applied to an inner surface of said perimeter wall for facilitating coupling said housing member to a male threaded vent.

2. The system of claim 1, further comprising a drop tube member having a perimeter wall, said drop tube member being elongate, said drop tube member being substantially cylindrical and hollow, said drop tube member being aligned with said lower aperture, said drop tube member having a proximal end abutting said housing member, said drop tube member having a distal end, said drop tube member having a length associated with a fill level of the fuel tank such that said distal end is positionable to abut a plane defined by the fill level of the fuel tank such that when fuel reaches the fill level the fuel substantially blocks said distal end and airflow is inhibited whereby said whistle assembly does not create an aural indication.

3. A fueling level indicator system comprising:
   a housing member coupleable to a fuel tank, said housing member being positionable adjacent to a vent opening in the fuel tank, said housing member defining an interior space, said housing member having a lower aperture facilitating environmental communication between said interior space and an interior of the fuel tank, said housing member having an upper aperture;
   a vent portion coupled to said housing, said vent portion being in environmental communication with said interior space of said housing member via said upper aperture, said vent portion facilitating air flow from the interior of the fuel tank through said housing and out of said system;
   a whistle assembly positioned substantially within said housing, said whistle assembly producing an aural indication of airflow through said housing member; and
   an elongated drop tube having a length, a proximal end and a distal end, said drop tube being aligned with said lower aperture and having said proximal end abutting said housing member;
   wherein said housing member further comprises a threaded portion, said threaded portion having a perimeter wall extending downwardly from a bottom wall of said housing member, said threaded portion having threads applied to an inner surface of said perimeter wall for selectively coupling said housing member to a female threaded vent, said threaded portion having threads applied to an outer surface of said perimeter wall facilitating coupling said housing member to a male threaded vent.

\* \* \* \* \*